(12) United States Patent
Opdahl et al.

(10) Patent No.: US 12,535,228 B2
(45) Date of Patent: Jan. 27, 2026

(54) SYSTEMS AND METHOD FOR INCREASING TEMPERATURES WITHIN OVENS HEATED BY FAN FRICTION

(71) Applicant: TPS, LLC, New Columbia, PA (US)

(72) Inventors: Barry J. Opdahl, New Columbia, PA (US); Andrew D. Burger-Renn, New Columbia, PA (US); Michael A. Schneck, New Columbia, PA (US)

(73) Assignee: TPS, LLC, New Columbia, PA (US)

( * ) Notice: Subject to any disclaimer, the term of this patent is extended or adjusted under 35 U.S.C. 154(b) by 804 days.

(21) Appl. No.: 17/563,588

(22) Filed: Dec. 28, 2021

(65) Prior Publication Data

US 2023/0204220 A1 Jun. 29, 2023

(51) Int. Cl.
*F24C 15/32* (2006.01)
*F04D 27/00* (2006.01)
*F24C 9/00* (2006.01)

(52) U.S. Cl.
CPC .......... *F24C 15/322* (2013.01); *F04D 27/004* (2013.01); *F24C 9/00* (2013.01)

(58) Field of Classification Search
CPC ........ F24C 15/322; F24C 9/00; F04D 27/004; F04D 27/008; F05D 2270/303; F05D 2270/335; Y02B 30/70

USPC ........................................................ 126/21 A
See application file for complete search history.

(56) References Cited

U.S. PATENT DOCUMENTS

| 11,480,361 | B1 * | 10/2022 | Broker ................. H02P 25/186 |
| 2007/0215143 | A1 * | 9/2007 | McCormick ............ F24B 1/024 |
| | | | 126/501 |
| 2020/0018557 | A1 * | 1/2020 | Johnson .................. F28D 20/02 |
| 2020/0240646 | A1 | 7/2020 | Opdahl et al. |
| 2021/0356221 | A1 * | 11/2021 | Blay ......................... F28C 1/14 |

FOREIGN PATENT DOCUMENTS

| CN | 105357978 A | * | 2/2016 | .......... A23B 4/0053 |
| CN | 210569957 U | * | 5/2020 | |
| CN | 110410980 B | * | 4/2021 | .............. F24F 11/64 |

\* cited by examiner

*Primary Examiner* — Allen R. B. Schult
*Assistant Examiner* — William C Weinert
(74) *Attorney, Agent, or Firm* — Amin, Turocy & Watson, LLP

(57) ABSTRACT

A friction heated oven with a processing chamber in fluid communication with a heating blower, where the heating blower is operably coupled to a motor that may be fitted with a sensor adapted to measure a condition and a first controller coupled to the sensor, whereby the first controller generates an output signal received by a second controller, where the second controller is configured to adjust, based on the output signal, a maximum allowable rotational speed of the motor.

20 Claims, 7 Drawing Sheets

SYSTEMS AND METHOD FOR INCREASING TEMPERATURES WITHIN OVENS HEATED BY FAN FRICTION

TECHNICAL FIELD

The subject disclosure relates to ovens heated by fan friction, and more specifically, to one or more ovens that can modulate temperature based on adjusting the amount of heat generated by fan friction independent of air circulation.

BACKGROUND

Friction-heated ovens employ the shearing action of an impeller to intentionally cause the heating of air or another fluid. The process temperature can be modulated by adjusting the rotational speed of the motor that drives the impeller. For example, a temperature sensor in the process chamber can be used as an input to drive a closed loop (PID loop) temperature controller. A motor speed controller can be driven by the output of the temperature controller. This system adjusts the amount of frictional heat input to the process by varying the speed of the friction motor.

Fan-cooled motors that are used to drive the friction blower will have a rated speed range, including a minimum and a maximum allowable RPM rating. Running the motor continuously outside the manufacturer's ratings may cause failure of the motor. The maximum allowable motor speed may be further limited by the maximum power rating of the motor. Depending upon the density and viscosity of the fluid that the impeller is driving, the motor may reach maximum output power before it reaches the maximum rated rotational speed.

In a typical embodiment, a motor speed controller may be set up so that when the temperature controller calls for "zero" output power, the motor speed controller will drive the motor at its minimum rated speed. When the temperature controller calls for 100% output power, the motor speed controller will drive the motor at the maximum rotational speed that will not exceed the motor's ratings.

The fluid will be most dense and viscous at lower temperatures and therefore the maximum allowable motor rotational speed would be identified and set in the motor speed controller for the lowest operating temperature. This ensures, for example, that the motor will not be overloaded at room temperature when the process is first started up and the fluid is dense. As the fluid temperature increases and the fluid becomes less dense, the torque imparted to the impeller will decrease and the motor output power will decrease below the maximum rating. So, if the maximum motor speed is set at the lowest operating temperature, the motor will remain at a safe level for all other process temperatures.

However, as the process temperature increases, the available motor power rapidly decreases. Compare this to a system that is heated with electric resistance heaters. In such a system, the heating input power can be maintained at the rated heater kW all the way up the temperature scale until the required set point is reached. In the above friction arrangement, the available heating power drops off rapidly as the fluid heats up and the heating rate slows down appreciably.

Disadvantages to existing systems include that (1) the maximum temperature that the fluid can reach will be limited and (2) it may take a long time to reach the set point, due to the continually decreasing power input.

SUMMARY

This invention relates to specialized heating systems which employ fan friction to heat and control the temperature of a fluid. It provides an improvement to existing frictionally heated systems in that it increases the maximum attainable process temperatures and reduces the time required to reach the set point. It discloses methods of automatically adjusting the maximum speed of the friction impeller, so that the maximum rated motor power is maintained at all times, despite changes in the fluid density.

The present invention addresses the above disadvantages by incorporating an algorithm into the control system. A system, such as a friction heated oven, may include a processing chamber in fluid communication with a heating blower, where the heating blower is operably coupled to a motor; a sensor adapted to measure a condition; a first controller operably coupled to the sensor and adapted to receive the condition, where the first controller is configured to generate and send an output signal; and a second controller configured to receive the output signal, where the second controller is configured to adjust, based on the output signal, a maximum allowable rotational speed of the motor.

The speed of a heating blower may be adjusted by adjusting a rotational speed of the motor via the second controller. A speed of the heating blower may be adjusted using at least one of a continuously variable transmission, a clutch, or a mechanical adjustable speed drive, operably coupled between the second motor and the heating blower. The second controller may be configured to adjust the maximum allowable rotational speed of the motor throughout substantially all of a range of conditions, where the range of conditions includes at least a first condition and a second condition different than the first condition, and the heating blower may be configured to operate at a first speed at the first condition and at a second speed that is greater than the first speed at the second condition. The output signal may be based on the condition and a feedback received by the first controller, the other feedback being at least one selected from a group of current draw experienced by the motor, power input to the motor, torque output of the motor, frequency output sent from the second controller to the motor, speed of the heating blower, and combinations thereof. The output signal may be based on the condition. The sensor may be located within the processing chamber. The first controller may include a proportional integral derivative (PID) control loop and an algorithm configured to alter an output of the PID control loop and generate an algorithmic output, where the algorithmic output may be based on at least one selected from a group of current draw experienced by the second motor, power input to the second motor, torque output of the second motor, frequency output sent from the second controller to the second motor, rotational speed of the heating blower, or combinations thereof. The first controller may include a proportional integral derivative (PID) control loop and an algorithm configured to alter an output of the PID control loop and generate an algorithmic output, where the algorithmic output may be based on the condition selected from a group of process temperature, process density, or process viscosity. The second controller may include a variable frequency drive (VFD), a pulse width modulated (PWM) AC speed control, a PWM DC speed control, a silicon-controlled rectifier (SCR) AC speed control, an SCR DC speed control, a variable voltage AC supply, a variable voltage DC supply, a variable current AC supply, a variable current DC supply, a thyristor-based AC motor speed control, a thyristor-based DC motor speed control, or a single-phase AC motor controller that uses phase angle control.

A method, such as a method for increasing the temperature of a friction-heated oven, may include (a) receiving, from at least one sensor, a first condition; (b) generating a first output signal, by a first controller, and based on at least a first algorithmic output that is a function of the first condition; (c) sending the first output signal to a second controller, where the first output signal correlates with a first maximum allowable rotational speed of a motor operably coupled to a heating blower; (d) receiving, from the at least one sensor, a second condition, where the second condition is different than the first condition; (e) generating a second output signal, by the first controller, and based on a second algorithmic output that is a function of the second condition; (f) sending the second output signal to the second controller, where the second output signal correlates with a second maximum allowable rotational speed of the motor, which is greater than the first maximum allowable rotational speed.

The method steps of (a) through (f) may be repeated until the condition is substantially equal to a set condition. The condition may be a condition of the process chamber. The motor may be operably coupled to a heating blower, where the first maximum allowable motor speed results in a first heating blower speed, and the second maximum allowable motor speed results in a second heating blower speed that is greater than the first heating blower speed. The receiving steps (a) and (d) further may include receiving, from a power sensor, power related feedback, where the power related feedback is at least one selected from a group of current draw experienced by the motor, power input to the motor, torque output of the motor, frequency output sent from the second controller to the motor, rotational speed of the heating blower, and combinations thereof; and where the first and second output signals generated at steps (b) and (e) are further based on the power related feedback. The receiving steps (a) and (d) further may include receiving, from a flow sensor in a circulation corridor, fluid property feedback, the fluid property feedback being at least one selected from a group of a density of fluid in a circulation corridor, a viscosity of the fluid in the circulation corridor, a temperature of the fluid in the circulation corridor, and combinations thereof; and where the first and second output signals generated at steps (b) and (e) are further based on the fluid property feedback. The sensor may be located within the processing chamber. The first controller may include a proportional integral derivative (PID) control loop and an algorithm configured to alter an output of the PID control loop and generate an algorithmic output, where the algorithmic output is based on at least one selected from a group of current draw experienced by the motor, power input to the motor, torque output of the motor, frequency output sent from the second controller to the motor, speed of the heating blower, or combinations thereof. The first controller may include a proportional integral derivative (PID) control loop and an algorithm configured to alter an output of the PID control loop and generate an algorithmic output, where the algorithmic output is based on at least one selected from a group of a density of fluid in a circulation corridor, a viscosity of the fluid in the circulation corridor, a temperature of the fluid in the circulation corridor, or combinations thereof. The second controller may include a variable frequency drive (VFD) a pulse width modulated (PWM) AC speed control, a PWM DC speed control, a silicon-controlled rectifier (SCR) AC speed control, an SCR DC speed control, a variable voltage AC supply, a variable voltage DC supply, a variable current AC supply, a variable current DC supply, a thyristor based AC motor speed control, a thyristor based DC motor speed control, or a single-phase AC motor controller that uses phase angle control.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
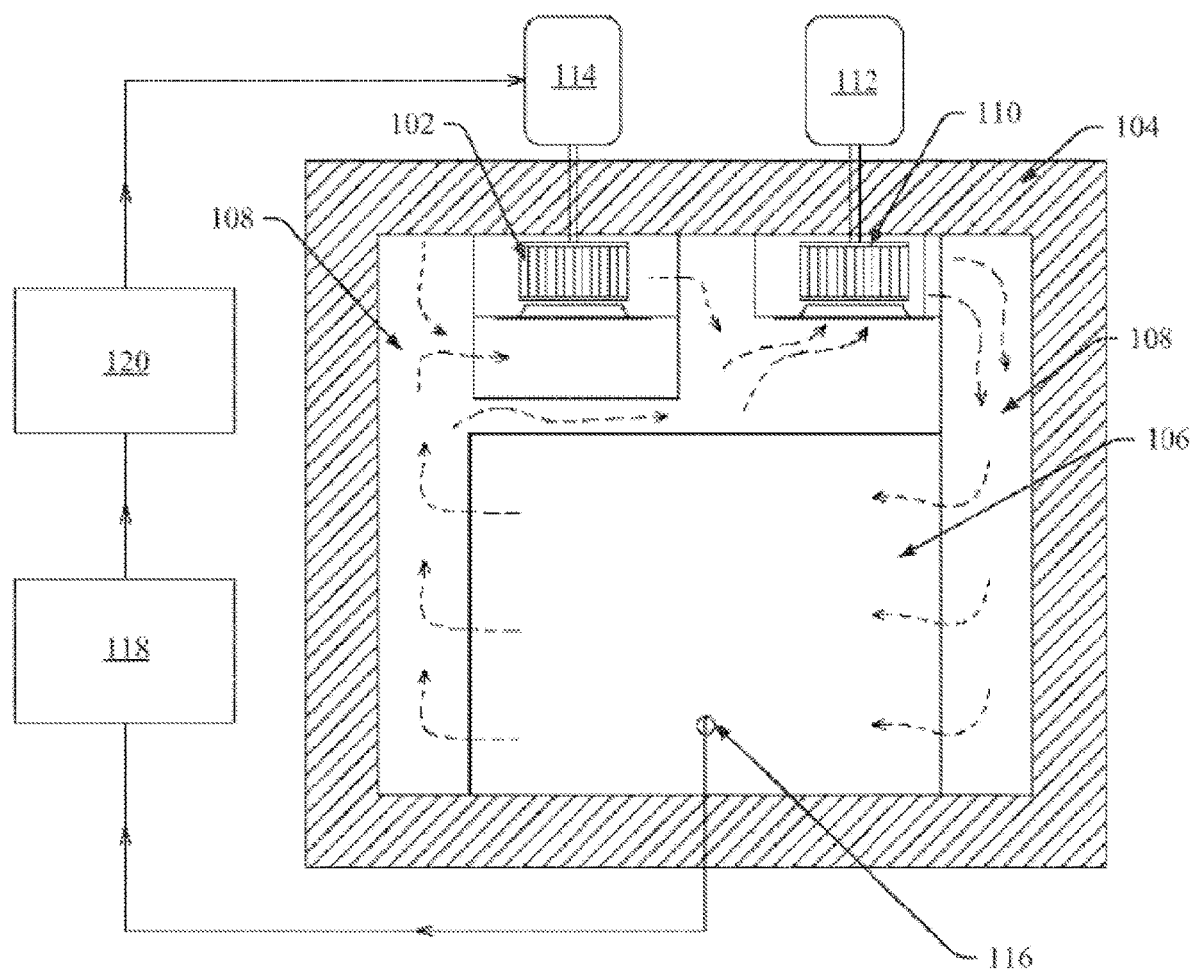
FIG. 1 is a diagram of an example system.

The present invention may be understood more readily by reference to the following detailed description taken in connection with the accompanying figures and examples, which form a part of this disclosure. It is to be understood that this invention is not limited to the specific devices, methods, applications, conditions, or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality," as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

The following detailed description is merely illustrative and is not intended to limit embodiments and/or application or uses of embodiments. Furthermore, there is no intention to be bound by any expressed or implied information presented in the preceding Conventional ovens often employ heating elements (e.g., electrical resistance heating elements) to communicate heat into a chamber for heating one or more items. In such instances, the heating elements themselves can have surface temperatures significantly higher than the surrounding environment. Thereby, the heating elements can cause non-uniform heating within the chamber (e.g., hot spots). Additionally, the heated surfaces of the heating elements can present an ignition hazard for flammable gases and/or vapors within the oven (e.g., caused by the heating of the one or more items and/or introduced to facilitate the heating). Known techniques seeking to avoid the potential hazards brought by the use of conventional heating elements (e.g., electrical resistance heaters, steam coils, fluid cells, fuel fired burners, a combination thereof, and/or the like) comprise circulating heated air into the chamber to render the heating of the one or more items; however, these techniques render heating the chamber dependent on manipulation of the air circulation (e.g., circulating less heated air and/or more cool air into the oven system). Varying the air circulation (e.g., adjusting the circulation rate by altering the exhaust rate) can affect the drying rates of the subject items and/or dilution rates of vapors generated by the heating.

Various embodiments described herein can regard an improvement to ovens and environmental systems that can generate heat through fan friction and/or modulate temperature within a processing chamber independent of air circulation. In an embodiment, a system is configured to have a motor operably coupled to a heating blower experience a current draw substantially near its maximum throughout a range of process temperatures within a process chamber. The processing chamber may be in fluid communication with a heating blower and a circulation blower, wherein the heating blower heats air by fan friction, and wherein the circulation blower circulates the air heated by the heating blower into the processing chamber. A first motor may be operably coupled to the circulation blower, and a second motor may be operably coupled to the heating blower. The system may include a sensor within the processing chamber adapted to measure a condition (e.g., temperature or viscosity) of the air and communicate the condition to a first controller. The first controller may be operably coupled to the sensor and adapted to receive the condition within the processing chamber from the sensor. The first controller may be configured to generate and send an output to an operably coupled second controller. The second controller may be operably coupled to the second motor, wherein the second controller is configured to adjust a maximum rotational speed of the second motor throughout a range of a condition, but without exceeding the motor's current (often measure in amperes or "amps") limit. It should be appreciated that a motor's maximum current draw, such as that of the second motor, is typically set by its manufacturer. It should further be appreciated that when this description references the rotation or the rotational speed of the heating blower, it includes the rotation or rotational speed of one or more impellers that are part of the heating blower. The one or more impellers are the part of the heating blower that spin, heating air via friction.

The heating blower and the circulation blower can be operated independent of each other. The heating blower can heat air via fan friction, while the circulation blower can circulate the heated air through the system. As the heating blower's rotational speed can be modulated, heat inputted into the processing chamber can be adjusted without varying the circulation flow rate. For example, one or more of the embodiments described herein can enable the air circulation (e.g., recirculation rates, intake rates, and/or exhaust rates) to remain constant at least because modulation of the heating blower can be used to independently control the oven temperature.

As used herein, the term "air" can refer to the normal atmospheric environment inside and/or outside the one or more ovens disclosed herein. For example, air can include the gaseous substance that surrounds the Earth (e.g., a mixture mainly of oxygen and nitrogen). In another example, air can include one or more gases such as, but not limited to: noble gases (e.g., argon), nitrogen, steam, a combination thereof, and/or the like. Additionally, air can be a fluid (e.g., a gas, a liquid, and/or a combination thereof).

FIG. 1 illustrates a diagram of an example system, a non-limiting oven 100 that can generate heat by a heating blower 102 and/or modulate a condition independent of air circulation within the oven 100 in accordance with one or more embodiments described herein. Repetitive description of like elements employed in other embodiments described herein is omitted for sake of brevity. The oven 100 can be defined by one or more exterior walls 104, which can be thermally insulated and/or can seal against unwanted air leakage between the interior of the oven 100 and the exterior of the oven 100. For example, the one or more exterior walls 104 can comprise one or more liners and/or insulation materials. One of ordinary skill in the art will recognize that the material composition and/or dimensions of the one or more outer walls 104 can vary depending on the function of the oven 100. Example materials that can comprise the one or more outer walls 104 can include, but are not limited to: iron, an iron alloy, steel, carbon steel, galvanized steel, aluminized steel, stainless steel, aluminum, glass, plastics, composites, wood, ceramics, a combination thereof, and/or the like.

As shown in FIG. 1, the oven 100 can comprise one or more processing chambers 106 located in the interior space defined by the one or more exterior walls 104. The one or more processing chambers 106 can define one or more spaces within the oven 100 where one or more items can be heated and/or cooled. For example, one or more items can be deposited and/or withdrawn from the one or more processing chambers 106 via one or more doors (not shown). The one or more processing chambers 106 can comprise the same composition as the one or more exterior walls 104 or a different composition than the one or more exterior walls 104. One of ordinary skill in the art will recognize that the material composition and/or dimensions of the one or more processing chambers 106 can vary depending on the function of the oven 100. Example materials that can comprise the one or more processing chambers 106 can include, but are not limited to: iron, an iron alloy, steel, carbon steel, galvanized steel, aluminized steel, stainless steel, aluminum, glass, plastics, composites, ceramics, a combination thereof, and/or the like.

FIG. 1 illustrates an embodiment in which one or more side walls of the one or more processing chambers 106 can be perforated to facilitate airflow (e.g., as represented by the dashed arrows shown in FIG. 1) into and/or through the one or more processing chambers 106. While FIG. 1 depicts an embodiment that can facilitate horizontal air circulation through the one or more processing chambers 106, the architecture of the one or more processing chambers 106 is not so limited. For example, one or more of the sidewalls of the one or more processing chambers 106 can be perforated to facilitate vertical air circulation.

Further, one or more circulation corridors 108 can be located between the one or more processing chambers 106 and the one or more exterior walls 104. The one or more circulation corridors 108 can direct air through the oven 100. The one or more circulation corridors 108 can work in conjunction with one or more circulation blowers 110 to generate a desired airflow (e.g., represented by the dashed arrows shown in FIG. 1) through the oven 100. The one or more circulation blowers 110 can comprise one or more high-velocity centrifugal blowers. Example types of circulation blowers 110 can include but are not limited to: forward-curved blowers, backward-incline blowers, backward-curved blowers, radial blowers, airfoil blowers, regenerative blowers, axial fans, propeller type fans, tubeaxial fans, vaneaxial fans, turbines, housingless blowers, eductors, jet pumps, venturi pumps, a combination thereof, and/or the like. As shown in FIG. 1, the one or more circulation blowers 110 can be operably coupled to one or more first motors 112, which can be located external to the oven 100. In one or more embodiments, the one or more circulation corridors 108 can guide an airflow generated by the one or more circulation blowers 110 into the one or more processing chambers 106 (e.g., as shown in FIG. 1). For example, one or more walls defining the one or more circulation corridors 108 can be perforated to facilitate the introduction and/or exit of airflow into and/or out of the one or more circulation corridors 108. For instance, perforated sections of wall can be depicted in FIG. 1 wherein the airflow (e.g., represented by dashed arrows) extend through the subject wall.

One or more of the circulation corridors 108 can also be in fluid communication with the one or more heating blowers 102. The one or more heating blowers 102 can comprise one or more impellers that can use the friction of moving air to produce heat (e.g., fan friction). One of ordinary skill in the art will recognize that various types of impellers and/or housings can comprise the one or more heating blowers 102. In various embodiments, the one or more heating blowers 102 can heat air traveling in the one or more circulation corridors 108. Example types of heating blowers 102 can include but are not limited to: forward-curved blowers, backward-incline blowers, backward-curved blowers, radial blowers, airfoil blowers, regenerative blowers, axial fans, propeller type fans, tubeaxial fans, vaneaxial fans, turbines, housingless blowers, eductors, jet pumps, venturi pumps, mixing impellers, shear mixers, vortex tubes, dispersion blades, blending blades, paddle mixers, a combination thereof, and/or the like. In some examples, the one or more heating blowers 102 can use fan friction to heat air comprised within the one or more circulation corridors 108. For instance, the one or more heating blowers 102 can be the primary heat source for the oven 100; thereby, replacing conventional heating elements, which can represent one or more hazards for at least the reasons described herein. As shown in FIG. 1, the one or more heating blowers 102 can be operably coupled to one or more second motors 114, which can be located external to the oven 100.

In one or more embodiments, the one or more heating blowers 102 can be in fluid communication with the one or more circulation blowers 110 (e.g., as shown in FIG. 1). For example, the one or more heating blowers 102 can heat air provided in the one or more circulation corridors 108 and/or supply the heated air to the one or more circulation blowers 110. The one or more circulation blowers 110 can then modulate circulation of the heated air in the one or more circulation corridors 108. For instance, the one or more circulation blowers 110 can moderate airflow in the one or more circulation corridors 108 that travels to the one or more processing chambers 106. At least because the one or more heating blowers 102 and the one or more circulation blowers 110 are powered by distinct motors (e.g., one or more first motors 112 and/or one or more second motors 114), the one or more heating blowers 102 can be operated independent of the one or more circulation blowers 110.

In one or more embodiments, the oven 100 can also comprise one or more sensors 116 located within the oven 100, such as a temperature sensor. For instance, the one or more sensors 116 can be located within the one or more processing chambers 106 (e.g., as shown in FIG. 1). Example sensors 116 can include, but are not limited to: a thermocouple, thermistor, a resistance temperature detector (RTD), a semiconductor-based temperature sensor, an infrared pyrometer, a combination thereof, and/or the like. The one or more sensors 116 can be operably coupled to one or more first controllers 118 via a direct electrical connection (e.g., as shown in FIG. 1) and/or a wireless network connection. For example, the one or more first controllers 118 can be digital first controllers 118 that can monitor the condition (such as the temperature of viscosity) of the air within the processing chamber 106 (e.g., via the one or more sensors 116). Alternatively or additionally, the one or more first controllers 118 can monitor the condition of the air within the one or more circulation corridors 108. A user of the oven 100 can utilize the one or more first controllers 118 to observe the air condition within the one or more processing chambers 106 and/or set changes to said condition (e.g., increase or decrease the air temperature within the one or more processing chambers 106). In one or more embodiments, the one or more first controllers 118 can be operably coupled to a plurality of sensors 116 located in various positions within the one or more processing chambers 106 to monitor air temperature uniformity within the one or more processing chambers 106. Example first controllers 118 can comprise, but are not limited to: analog controllers, digital proportional integral derivative (PID) controllers, programmable logic controllers, computer software, a combination thereof, and/or the like.

The one or more first controllers 118 can be further coupled to one or more second controllers 120 via a direct electrical connection (e.g., as shown in FIG. 1) and/or a wireless network connection. Further, the one or more second controllers 120 can be operably coupled to the one or more second motors 114 via a direct electrical connection (e.g., as shown in FIG. 1) and/or a wireless network connection. For example, the one or more second controllers 120 can be an alternating current ("AC") variable frequency drive ("VFD"), which can enable the speed (i.e., revolutions per minute ("RPM")) of the one or more second motors 114 to be varied over a wide range. Example of second controllers 120 can include, but are not limited to: variable frequency drive (VFD), a Pulse Width Modulated (PWM) AC speed control, a PWM DC speed control, a Silicon Controlled Rectifier (SCR) AC speed control, an SCR DC speed control, a variable voltage AC supply, a variable voltage DC supply, a variable current AC supply, a variable current DC supply, a thyristor based AC motor speed control, a thyristor based DC motor speed control, or a single-phase AC motor controller that uses Phase Angle Control, mechanical speed controls, a combination thereof, and/or the like. Additionally or alternatively, the second controller may limit or adjust output power to the one or more second motors 114 using a regulated power supply that incorporates a constant current limiting circuit, a fold-back current limiting circuit, or other type of output power limiting. Additionally or alternatively, the second controller may monitor and/or adjust the input power to the heating blower 102 using a continuously variable transmission or clutch operably coupled between the second motor 114 and the heating blower 102.

The one or more first controllers 118 can generate a signal output based on the monitored condition (e.g., air temperature) within the one or more processing chambers 106 (which the first controller 118 receives as feedback) and/or one or more user inputs supplied to the one or more first controllers 118. The output signal may additionally or alternatively be based on other feedback, such as current draw experienced by the second motor, power input to the second motor 114, torque output of the second motor 114, rotational speed of the heating blower 102, and/or a frequency output sent from the second controller 120 to the second motor 102. The inputs may include, for example, properties of the air within the one or more processing chambers 106 and the one or more circulation corridors 108. The properties may be related to those that affect fluid flow, such as viscosity or density of the air. The inputs may further include how these properties, with respect to a particular air formulation, are altered with a change in temperature. Additionally or alternatively, some or all of these inputs may be automatically retrieved from a database that electronically stores these properties and is in electronic communication with the first controller 118. It will be appreciated that the output signal of the first controller 118 may be a combination of outputs from, for example, a PID control loop and an algorithm. The algorithm may alter the output of the PID control loop in generating its own output.

In an embodiment, in generating a signal output, and sending it to the second controller 120, the first controller 118 may utilize an algorithm in its system software, wherein the output of the algorithm is a function of the temperature of the air within a process chamber 106 (the "process temperature") or circulation corridor 108. It will be appreciated that the output signal of the first controller 118 may a combination of outputs from, for example, PID control loop and an algorithm. Additionally or alternatively, the output of the algorithm may be a function of current draw of the second motor, power input to the second motor 114, torque output of the second motor 114, rotational speed of the heating blower 102, and/or a frequency output sent from the second controller 120 to the second motor 102. Additionally or alternatively, the output of the algorithm may be a function of one or more inputs, such as the air's density or viscosity (as either change within a range of temperatures), or other properties of the fluid. In an embodiment, output of the algorithm (and thus, the output of the first controller 118) may result in a linear increase in rotational speed of the second motor 114 as the process temperature increases from an initial to a set temperature, allowing the second motor 114 to experience a current draw substantially near its maximum while the process temperature increases to the set temperature.

The output signal of the first controller 118 can be sent to the one or more second controllers 120, which can then modulate operation of the one or more second motors 114, and thereby the one or more heating blowers 102, based on the signal (e.g., an electrical signal). For instance, the one or more second controllers 120 can control operation of the one or more second motors 114 to vary the maximum rotational speed of one or more impellers comprised within the one or more heating blowers 102; thereby modulating the amount of heat generated by the one or more heating blowers 102. Thus, the one or more second controllers 120 can modulate the temperature (or other condition) within the one or more processing chambers 106 by varying the operation of the one or more heating blowers 102 (e.g., via the one or more second motors 114) based on one or more signals (e.g., commands) generated by the one or more first controllers 118. In an embodiment, the maximum rotational speed of the heating blower 102 may be automatically adjusted or limited by using a continuously variable transmission, clutch, or a mechanical adjustable speed drive between the second motor 114 and the heating blower 102.

In an embodiment of a friction heated oven system, the first controller 118 has a proportional-integral-derivation (PID) controller, and the second controller 120 has a variable frequency drive (VFD) that controls the second controller's output frequency to the second motor 114. The algorithm is used to adjust the PID loop output signal of the first controller 112 before it is sent to the second controller 120. For example, the algorithm may produce an output (an "algorithmic output") which varies between 0.75 and 1.00 for process temperatures between an initial temperature and a set temperature. The PID loop output signal is multiplied by algorithmic output, and the resulting product is sent from the first controller to the second controller as an analog signal to control the maximum rotational motor speed. In an embodiment, the second controller is set to operate the second motor at a maximum speed at 80 Hz—a maximum motor frequency. This speed is selected to prevent overloading of the motor at the set temperature. At the initial temperature, the output of the second controller may be 60 Hz (based on the algorithmic output)—a first motor frequency. This speed is selected to prevent overloading of the second motor at the initial temperature. The effect of this arrangement is that when the temperature is gradually increased from the initial temperature to the set temperature, the motor frequency of the second motor is gradually increased from the first motor frequency to the maximum motor frequency. This gradual increase in motor frequency sent from the second controller and received by the second motor allows the second motor to experience a current draw substantially near its maximum for all temperatures between and including the initial temperature and the set temperature. The same principle applies to other conditions, such as viscosity of the air. This allows process chambers 106 within friction heated ovens 100 to reach higher temperatures and reach them in shorter periods of time. Without the adjustment provided by the algorithmic adjustment, as the temperature increases and the air becomes less dense, the motor torque will drop off rapidly, the motor will do less work and its experienced current draw will be less.

In another embodiment of a friction heated oven system, a signal generated by a first controller 118 and sent to a second controller 120 controlling the second motor 114 varies based on the monitored (or process) temperature within a processing chamber 116. In this embodiment, the monitored temperature is substantially equal to or between an ambient (or initial) temperature and a final (or set) temperature, which is the process temperature the user of the oven would like the oven to be maintained at for a period of time. The temperatures between and including the initial and set temperatures may be known as the range of temperatures. At the initial temperature, as measured by a sensor 116, the first controller 118 sends a first signal to the second controller 120 allowing the second motor 114 to operate at a first maximum rotational speed. At a second temperature greater than the first temperature, the first controller 118 sends a second signal to the second controller 120 allowing the second motor 114 to operate at a second maximum rotational speed that is greater than the first speed. This may be repeated automatically (i.e., without user intervention) until the process temperature is substantially equal to the set temperature, at which point the signal from the first controller to the second controller commands the motor to operate at a speed such that the process temperature is maintained at or substantially near the set temperature for a period of time. Where (n) is the number of temperatures between and including the initial and final temperatures, there may be (n) number of distinct signals the first controller 118 can send the second controller, resulting in (n) number of distinct maximum rotational speeds of the second motor. The maximum rotational motor speeds of the second motor, such as the first and second and (n)th speeds, are chosen so as to maintain the maximum output power of the second motor (as rated by its manufacturer) throughout the entire range of temperatures between and including the initial and set temperature, but not to exceed the rated output power of the second motor. Alternatively or additionally, the motor speeds of the second motor, such as the first and second and (n)th speeds, are chosen so as to have the second motor experience its maximum rated current draw throughout the entire range of temperatures between and including the initial and set temperature.

For example, the initial temperature may be 70 degrees F. and the set temperature may be 700 degrees F. As the process temperature rises from 70 degrees F. to 700 degrees F., the maximum rotational motor speed of the second motor 114 may start out at 3600 RPM and be slowly increased to 4800 RPM, as the first controller 114 (via an algorithm, as discussed above) compensates for the increase in process temperature, and accordingly, a decrease in fluid density. Increasing the maximum rotational speed of the second motor 114 as the process temperature increases allows the process chamber 114 to reach significantly higher process temperatures and to reach them in a shorter period of time than systems where the maximum rotational speed of the second motor 114 is not increased in accordance with an increase in process temperature. Increasing the maximum rotational speed of the second motor 114 as the process temperature increases allows for maximum power output and experience current draw of the second motor throughout the range of temperatures without it overloading.

In an embodiment, at an initial or first temperature, the first controller 118 sends a first signal to the second controller 120 allowing the second motor 114 to operate at a first maximum rotational speed. At the first speed, the second motor 114 is operating substantially near its maximum rated current draw. At a second temperature greater than the first temperature, where the second motor 114 is not operating substantially near its maximum rated current draw, the speed of the motor 114 may be manually increased by a user, for example, by selecting one of several speeds on a multi-speed electric motor, such that the second motor speed 114 is increased from a first speed to a second speed greater than the first speed, wherein the second motor 114 operating at the second speed is operating substantially near its maximum rated current draw. These steps may be repeated until the process temperature of the air reaches the set temperature.

In an embodiment, the first controller 118 monitors the current draw experienced by the second motor 114. The first controller 118 may monitor the current draw via feedback from the second controller 120 or a separate sensor, such as a current transducer. Additionally, the first controller 118 receives, for example, from an electronically connected database or from user input, a maximum rating of the second motor's current draw. For example, if the second motor's 114 experienced current draw is below its maximum rating, the first controller 118 may send a signal to the second controller 120 commanding the second controller 120 to increase the frequency to the second motor 114, and thus, the rotational speed, of the motor 114 until the second motor's 114 experienced current draw is substantially near its maximum rating. Further, if the second motor's current draw is exceeding its maximum rating, the first controller 118 may send a signal to the second controller 120 commanding the second controller 120 to decrease the frequency of the motor until the second motor's 114 experienced current draw is substantially near its maximum rating.

In an embodiment, the first controller 118 may monitor the power consumption of the second motor 114. The first controller 118 may monitor the power consumption via feedback from the second controller or a separate sensor. Additionally, the first controller 118 receives, for example, from an electronically connected database or from user input, a maximum rating of the power consumption of the second motor 114. For example, if the second motor's 114 power consumption is below its maximum rating, the first controller may send a signal to the second controller 120 commanding the second controller 120 to increase the frequency, and thus, the speed, of the motor 114 until the second motor's 114 power consumption is substantially near its maximum rating. Further, if the second motor's 114 power consumption is exceeding its maximum rating, the first controller 118 may send a signal to the second controller 120 commanding the second controller 120 to decrease the frequency of the motor 114 until the second motor's 114 power consumption is substantially near its maximum rating.

In an embodiment, the first controller 118 may monitor the torque output of the second motor 114. The first controller 118 may monitor the torque output via feedback from the second controller 120, the second motor 114, or a separate sensor. Additionally, the first controller 118 may receive, for example, from an electronically connected database or from user input, a maximum torque rating of the second motor 114. In an embodiment, if the second motor's 114 torque output is below its maximum rating, the first controller 118 may send a signal to the second controller 120 commanding the second controller 120 to increase the frequency, and thus, the speed, of the motor 114 until the second motor's 114 torque output is substantially near its maximum rating. Further, if the second motor's 114 torque output is exceeding its maximum rating, the first controller 118 may send a signal to the second controller 120 commanding the second controller 120 to decrease the frequency of the motor 114 until the second motor's 114 torque output is substantially near its maximum rating.

Moreover, operation of the one or more heating blowers 102 can be controlled (e.g., by the one or more second controllers 120) independent of the one or more circulation blowers 110. Thereby the amount of heat generated by the oven 100 (e.g., via fan friction of the one or more heating blowers 102 instead of, or supplement to, conventional heating elements) can be adjusted independent of the airflow established by the one or more circulation blowers 110. For example, the amount of heat generated by the one or more heating blowers 102 can vary based on the temperature conditions within the one or more processing chambers 106 (e.g., as monitored by the one or more temperature sensors 116), while the airflow within the oven 100 can remain constant.

In one or more embodiments, one or more conventional heat sources can be present within and/or adjacent to the oven 100 in addition to the one or more heating blowers 102 and/or circulation blowers 110. For example, the one or more conventional heat sources can provide supplemental heat to the heat generated by the one or more heating blowers 102, which can enable embodiments of the oven 100 comprising heating blowers 102 of various size and/or power. The conventional heat sources can have a fixed power output or can be adjustable and/or modulated. Additionally, the type of circulation blowers 110 included in the oven 100 can be selected based on a desired base temperature range of the oven 100. In one or more embodiments, one or more of the heating blowers 102 can operate at a fixed speed to establish a base heating temperature, wherein one or more other heating blowers 102 can operate at adjustable speeds to modulate the working temperature within the one or more processing chambers 106.

Figure 2:
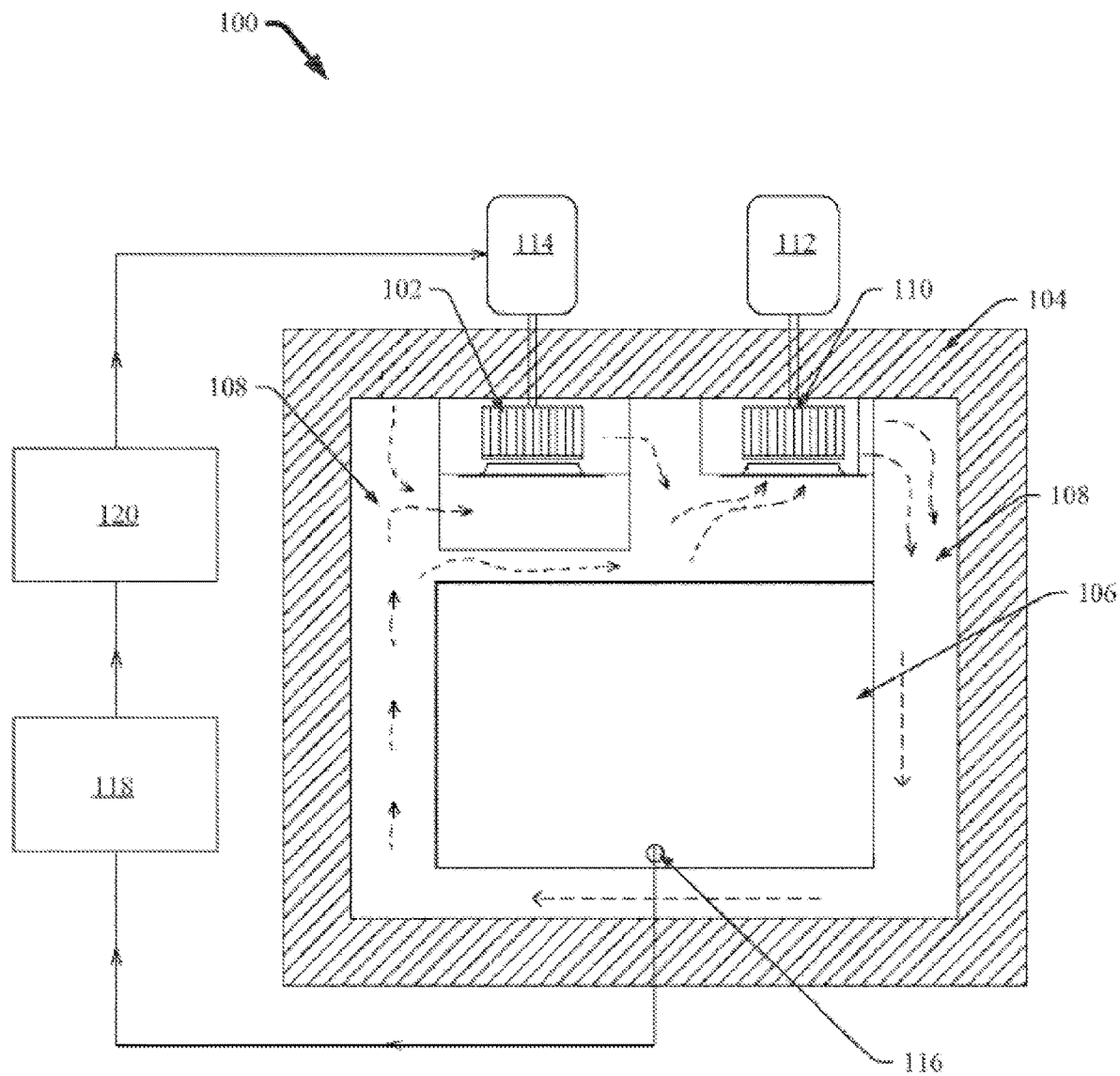
FIG. 2 is a diagram of an example system.

FIG. 2 illustrates an example, non-limiting diagram of the oven 100, wherein the one or more circulation corridors 108 can extend further around the one or more processing chambers 106. Repetitive description of like elements employed in other embodiments described herein is omitted for sake of brevity. FIG. 2 exemplifies that the one or more circulation corridors 108 can be positioned in a variety of arrangements to facilitate the heating of one or more processing chambers 106 via one or more airflow configurations (e.g., driven by the one or more circulation blowers 110).

As shown in FIG. 2, the one or more circulation corridors 108 can surround the entire, or substantially the entire, perimeter of the one or more processing chambers 106. For example, air heated by the one or more heating blowers 102 can be circulated around and/or adjacent to the one or more processing chambers 106 by the one or more circulation blowers 110 (e.g., as shown in FIG. 2). Heated air flowing adjacent to the one or more processing chambers 106 can in turn heat the one or more processing chambers 106 (e.g., at least because of the heated air's proximity to the one or more processing chambers 106). In another example, various airflow configurations within the one or more processing chambers 106 can be facilitated by supplying heated air to various sides of the one or more processing chambers 106 via the one or more circulation corridors 108 extending around the one or more processing chambers 106. For instance, three of the walls defining a processing chamber 106 can be perforated to facilitate horizontal and/or vertical airflow configurations.

Figure 3:
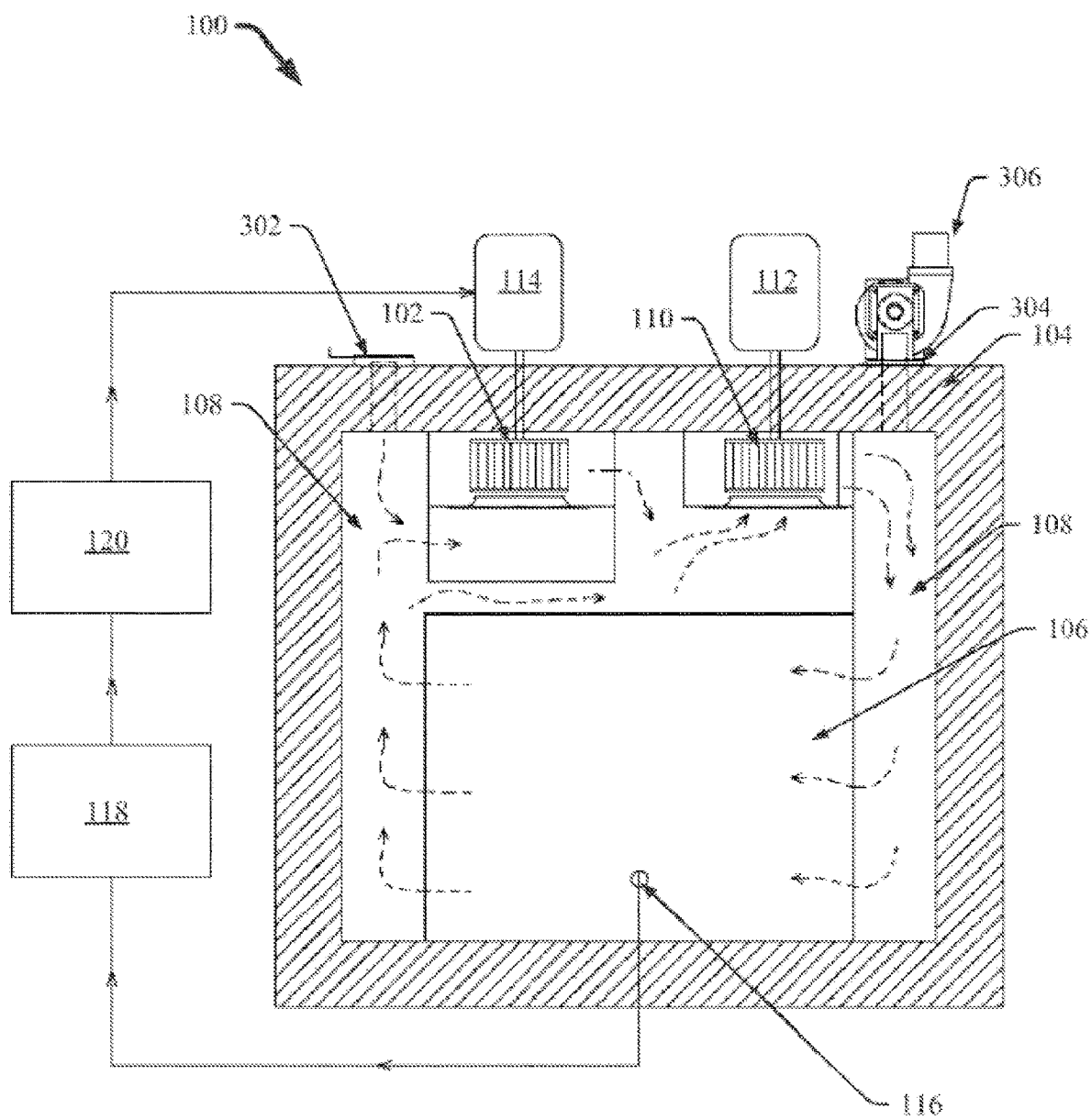
FIG. 3 is a diagram of an example system.

FIG. 3 illustrates an example, non-limiting diagram of the oven 100 further comprising one or more intake ports 302 and/or one or more exhaust ports 304 in accordance with one or more embodiments described herein. Repetitive description of like elements employed in other embodiments described herein is omitted for sake of brevity. As shown in FIG. 3, the one or more intake ports 302 and/or the one or more exhaust ports 304 can be in fluid communication with the one or more circulation corridors 108 through the one or more exterior walls 104 of the oven 100.

In one or more embodiments, the intake port 302 and/or the exhaust port 304 can be utilized by the oven 100 to draw external air into the oven 100 and/or expel processed air out of the oven 100. By cycling fresh air into the airflow within the oven 100 and/or expelling processed air out of the oven 100, vapors resulting from heating one or more items within the one or more processing chambers 106 can be expelled from the one or more processing chambers 106 before becoming hazardous.

For example, in one or more embodiments air heated by the one or more heating blowers 102 can be fresh air introduced into the oven 100 via the one or more air intake ports 302. For instance, the fresh air can be isolated from the processed air (e.g., air previously heated and/or introduced into the one or more processing chambers 106) such that the one or more heating blowers 102 heat fresh air and can avoid heating processed air, which can comprise one or more contaminates originating from the heating in the one or more processing chambers 106.

The one or more circulation blowers 110 can then circulate the heated fresh air through the oven 100 (e.g., into the one or more processing chambers 106) while the processed air (e.g., air already used to heat one or more items within the one or more processing chambers 106) can be expelled from the oven 100 via the one or more exhaust ports 304.

In another example, in one or more embodiments the one or more heating blowers 102 can heat fresh air (e.g., supplied by the one or more air intake ports 302) and/or processed air (e.g., previously heated air driven to the one or more heating blowers 102 by an airflow generated by the one or more circulation blowers 110) in combination. In other words, the fresh air can be mixed with processed air within the oven 100 during the heating achieved by the one or more heating blowers 102.

In one or more embodiments, the oven 100 can comprise various configurations of the one or more intake ports 302 and/or exhaust ports 304. For example, the oven 100 can lack the one or more input ports 302 and/or exhaust ports 304 (e.g., as shown in FIG. 1). In another example, the oven 100 can comprise one or more input ports 302 and/or one or more exhaust ports 304. In a further example, the oven 100 can comprise one or more input ports 302 operably coupled to one or more intake blowers (not shown) and/or one or more exhaust ports 304 operably coupled to one or more exhaust blowers 306 (e.g., as shown in FIG. 3).

One of ordinary skill in the art will recognize that the architecture of the one or more circulation corridors 108 can vary to facilitate embodiments in which fresh air is isolated or mixed with processed air during the heating by the one or more heating blowers 102. Whether the fresh air is isolated or mixed with the processed air can depend on the function of the oven 100 and/or the items being heating within the one or more processing chambers 106.

Figure 4:
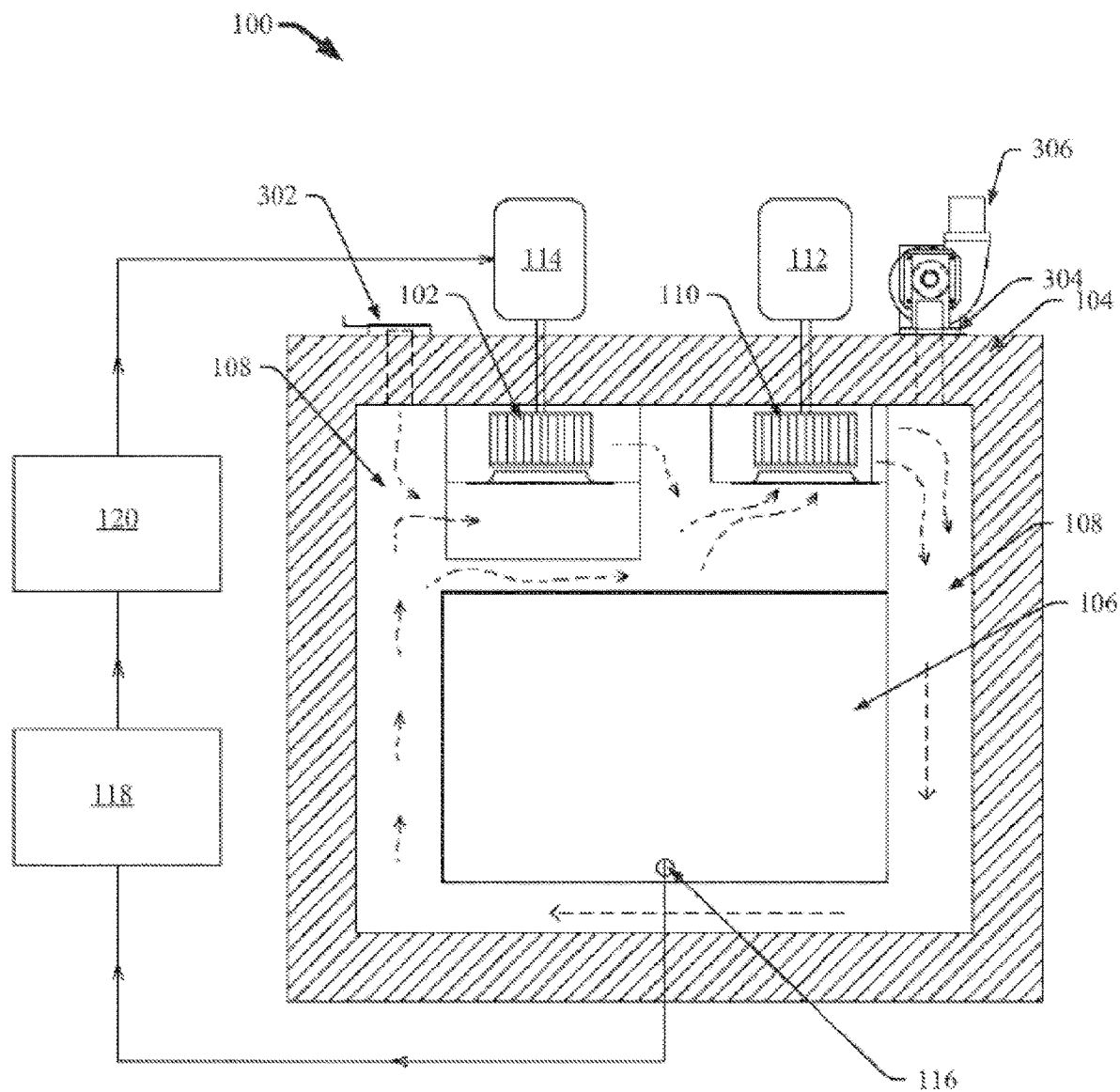
FIG. 4 is a diagram of an example system.

FIG. 4 illustrates a diagram of the example, non-limiting oven 100 comprising the one or more air intake ports 302 and/or exhaust ports 304 (e.g., including one or more exhaust blowers 306) in accordance with one or more embodiments described herein. Repetitive description of like elements employed in other embodiments described herein is omitted for sake of brevity. FIG. 4 exemplifies that the oven 100 can be configured with one or more air intake ports 302 and/or one or more exhaust ports 304 with various circulation corridor 108 arrangements.

Figure 5:
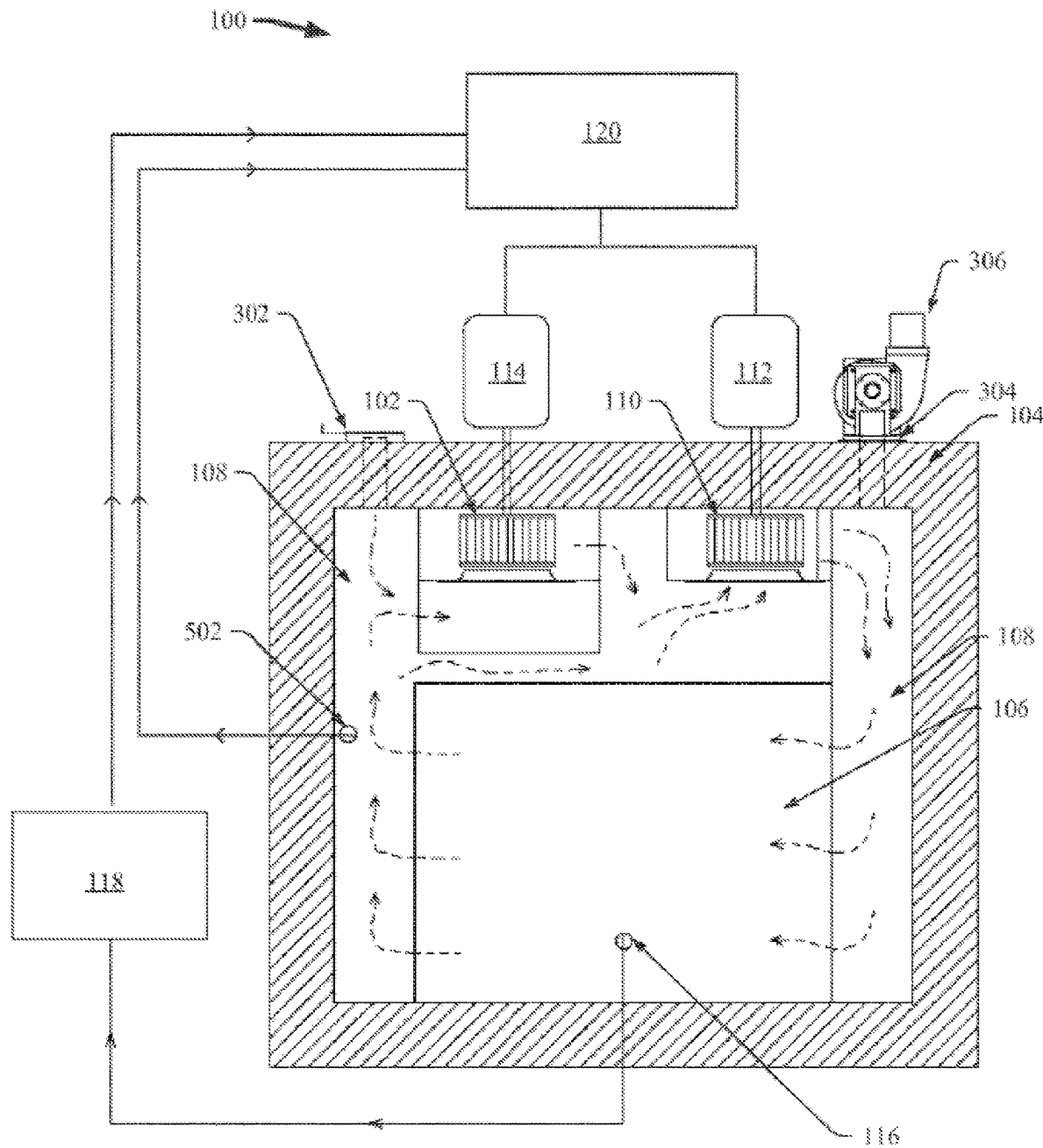
FIG. 5 is a diagram of an example system.

FIG. 5 illustrates a diagram of the example, non-limiting oven 100, wherein the second controller 120 can be operably coupled to both the first motor 112 and/or the second motor 114 in accordance with one or more embodiments described herein. Repetitive description of like elements employed in other embodiments described herein is omitted for sake of brevity. For example, the second controller 120 can control operation of both the one or more heating blowers 102 and/or the one or more circulation blowers 110 (e.g., via the one or more second motors 114 and/or the one or more first motors 112) independent of each other.

Further, the oven 100 can comprise one or more airflow sensors 502 positioned in the one or more circulation corridors 108 (e.g., as shown in FIG. 5) and/or in the one or more processing chambers 106. The one or more airflow sensors 502 can be operably coupled (e.g., via a direct electrical connection and/or via a wireless network connection) to the one or more second controllers 120. Also, the one or more airflow sensors 502 can monitor one or more properties of the airflow generated by the one or more circulation blowers 110 at one or more locations within the oven 100. Example properties that can be monitored by the one or more airflow sensors 502 can include, but are not limited to: air velocity, humidity, air composition (e.g., the presence of one or more hazardous vapors), air temperature, oxygen concentration, dewpoint, a combination thereof, and/or the like. For instance, one or more of the airflow sensors 502 can comprise anemometers to facilitate monitoring air velocity.

In one or more embodiments, the second controller 120 can control operation of the one or more circulation blowers 110 based on one or more airflow properties monitored by the one or more airflow sensors 502. For example, the second controller 120 can increase the RPMs of the one or more first motors 112 in order to increase the amount of airflow generated by the one or more circulation blowers 110 based on an amount of hazardous vapors detected by the one or more airflow sensors 502. Thereby, the oven 100 can mitigate potential damages that can be caused by the buildup of hazardous vapors as a result of the heating in the one or more processing chambers 106. As described herein, the second controller 120 can modulate the heating generated by the one or more heating blowers 102 independent of the airflow generated by the one or more circulation blowers 110. Alternatively, in one or more embodiments, the one or more first motors 112 can be controlled by a one second controller 120 while the one or more second motors 114 can be controlled by another second controller 120.

Figure 6:
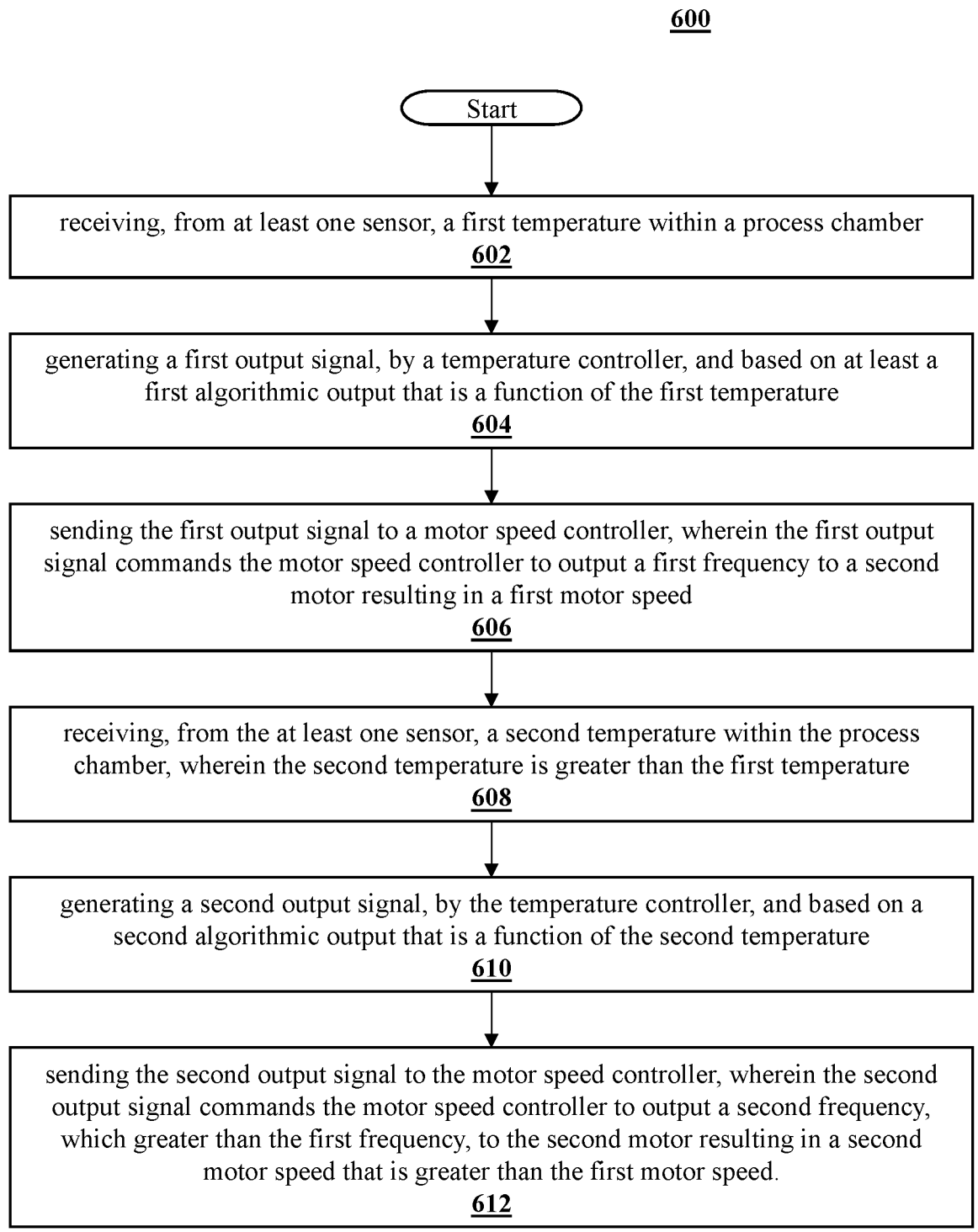
FIG. 6 is a diagram of an example method.

FIG. 6 illustrates a flow diagram of an example, non-limiting method 600 that can regard heating process chamber 116 via fan friction independent of adjusting airflow in accordance with one or more embodiments described herein. Repetitive description of like elements employed in other embodiments described herein is omitted for sake of brevity.

At 602, the method 600 can include receiving, from at least one temperature sensor 116, a first temperature (or other condition) within a process chamber 106. The sensor 116 may be located within the process chamber. For example, the first controller 118, which is operably coupled to the at least one temperature sensor 116, may receive the first temperature. The first temperature may be an initial temperature, for example, 70 degrees F. Additionally or alternatively, the first temperature may be a temperature between an initial temperature and a set temperature like in an instance when the method 600 is repeated until the second temperature received at 608 is approximately equal to the set temperature.

At 604, the method 600 can include generating a first output signal, by a first controller 118, and based on at least a first algorithmic output that is a function of the first temperature.

At 606, the method 600 can include sending the first output signal to a second controller, wherein the first output signal commands the second controller to output a first frequency to the second motor that correlates with a first maximum allowable rotational speed of the second motor.

At 608, the method 600 can include receiving, from the at least one sensor, a second temperature within the process chamber, wherein the second temperature is greater than the first temperature.

At 610, the method 600 can include generating a second output signal, by the first controller, and based on a second algorithmic output that is a function of the second temperature.

At 612, the method 600 can include sending the second output signal to the second controller, wherein the second output signal commands the second controller to output a second frequency, which greater than the first frequency, to the second motor that correlates with a second maximum allowable rotational speed of the second motor that is greater than the first maximum allowable rotational speed.

In an embodiment the method 600 may be repeated until the second temperature received at 608 is approximately equal to the set temperature. In an embodiment where the initial temperature is 70 degrees F. and the set temperature is 700 degrees F., the first temperature received at 602 may be 70 degrees F., and the second temperature received at 608 may be 90 degrees F. Because the second temperature at 608 is not approximately equal to the set temperature, the method 600 may be repeated after steps 610 and 612 are completed. During a repeat of the method 600, the first temperature is greater than the previous second temperature as a result of the second motor speed creating additional fan friction in the heating blower than when operating at the first motor speed.

In an embodiment, the second motor 114 is operably to a heating blower, wherein the first motor speed results in a first heating blower speed, and the second motor speed results in a second heating blower speed that is greater than the first heating blower. Thus, the friction (and, accordingly, the heat) generated by the heating blower 102 at the second heating blower speed is greater than that produced by the heating blower 102 at the first heating blower speed, resulting in an increase in process temperature within a process chamber 106.

In an embodiment, the second motor 114 experiences a current draw approximately near its maximum allowable current draw when the heating blower 102 operates at both the first heating blower speed and the second heating blower speed. This allows the process chamber 106 to reach higher temperatures and reach them quicker than embodiments where maximum current draw is not maintained as the process temperature increases. It should be appreciated that once the process temperature is substantially equal to the set temperature, the second motor 114 may need to operate at less than its maximum allowable current draw and maximum rotational speed so as not to increase the process temperature substantially greater than the set temperature.

Figure 7:
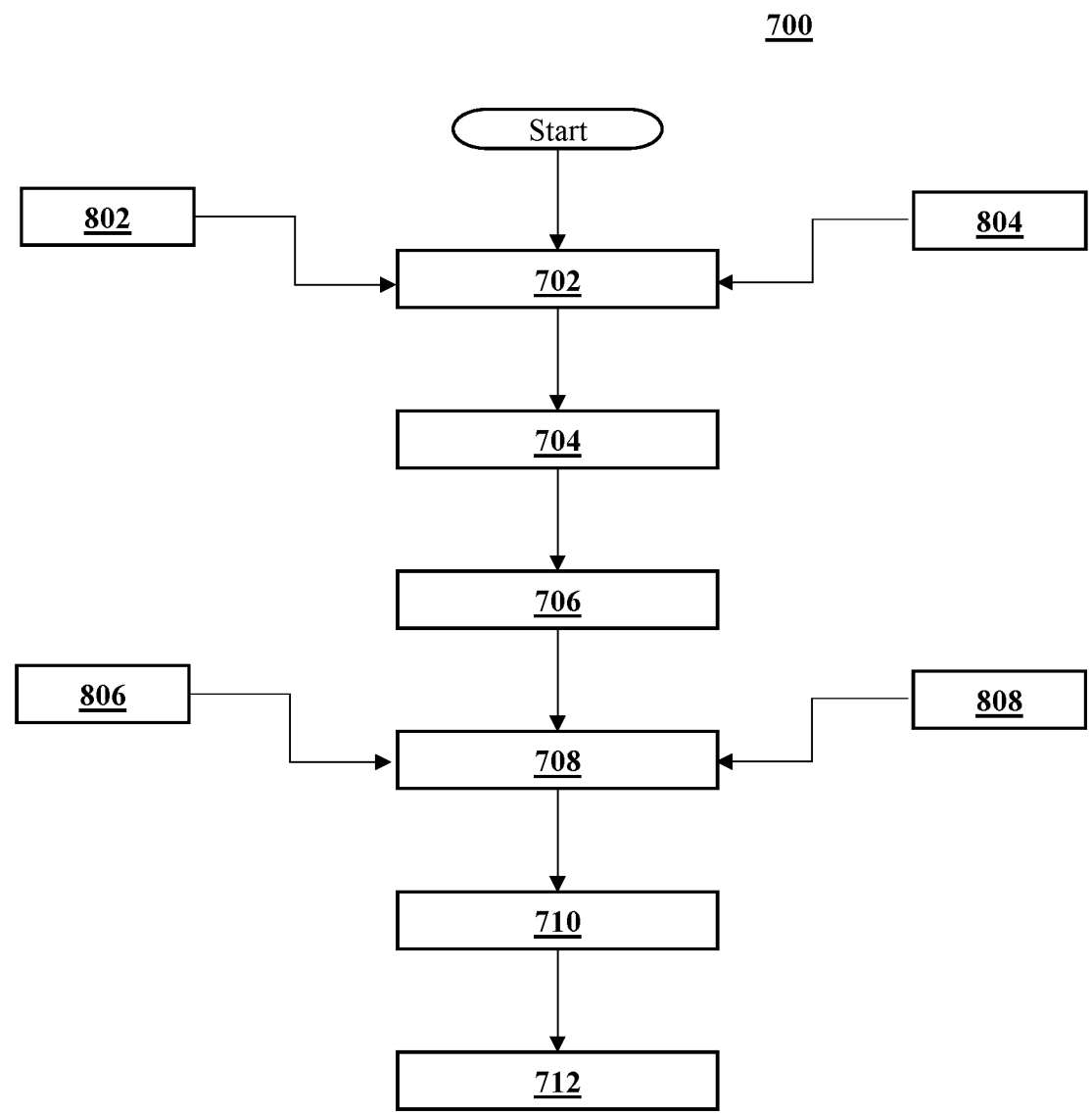
FIG. 7 is a diagram of an example method.

Referring to FIG. 7, in an embodiment of the method 700, the receiving steps 702 and 708 further include receiving, from at least one power sensor, power related feedback 802/806, wherein the power related feedback 802/806 is at least one selected from a group of current draw experienced by the second motor, power input to the second motor, torque output of the second motor, frequency output sent from the second controller to the second motor, rotational speed of the heating blower, and combinations thereof. In this embodiment, the first and second output signals may be further based on the power related feedback. The at least one power sensor may be included within the second controller 120, operably coupled to the second controller 120, the second motor 114, the heating blower 102, or a combination thereof (e.g., operably coupled between the second controller 120 and the second motor 114).

In an embodiment, the first and second algorithmic outputs (and, by consequence, the first and second output signals generated at 704 and 710) can be a function of the power related feedback. For example, where the power related feedback is current draw experienced by the second motor, the algorithmic output may be adjusted when the current draw experienced is less than the second motor's 114 maximum, such that the speed of the motor is increased to the point where the second motor 114 is experiencing a current draw substantially near its maximum, thus raising the temperature within the process chamber 106.

In an embodiment of the method 700, the receiving steps of 702 and 708 further include receiving, from at least one airflow sensor in a circulation corridor, air property feedback 804/808, wherein the air property feedback being at least one selected from a group of a density of air in a circulation corridor, a viscosity of the air in the circulation corridor, a temperature of the air in the circulation corridor, and combinations thereof.

In an embodiment, the first and second algorithmic outputs (and, by consequence, the first and second output signals generated at 704 and 710) can be a function of the air property feedback 804/808. For example, where the air property feedback 804/808 is density of the air in the circulation corridor 108, the algorithmic output may be adjusted when the density of the air decreases, such that the speed of the motor is increased to the point where the second motor 114 is experiencing a current draw substantially near its maximum, thus raising the temperature within the process chamber 106.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A system, comprising:
    a processing chamber in fluid communication with a heating blower, wherein the heating blower is operably coupled to a motor;
    a sensor adapted to measure one or more conditions, wherein the one or more conditions comprise air viscosity;
    a first controller operably coupled to the sensor and adapted to receive the one or more conditions, wherein the first controller is configured to generate and send an output signal, wherein the output signal is based on the one or more conditions and a feedback received by the first controller, and wherein the feedback comprises torque output of the motor; and
    a second controller configured to receive the output signal, wherein the second controller is configured to adjust, based on the output signal, a maximum allowable rotational speed of the motor, wherein rotation speed of the motor is less than the maximum allowable rotation speed of the motor, and wherein the maximum allowable rotational speed prevents failure of the motor.

2. The system of claim 1, wherein the speed of a heating blower is adjusted by adjusting the rotational speed of the motor via the second controller.

3. The system of claim 1, wherein a speed of the heating blower is adjusted using at least one of a continuously variable transmission, a clutch, or a mechanical adjustable speed drive, operably coupled between the motor and the heating blower.

4. The system of claim 1, wherein the second controller is configured to adjust the maximum allowable rotational speed of the motor throughout substantially all of a range of conditions, and to prevent overload of the motor, wherein the range of conditions includes at least a first condition and a second condition different than the first condition, and the heating blower is configured to operate at a first speed at the first condition and at a second speed that is greater than the first speed at the second condition.

5. The system of claim 1, wherein the feedback is at least one selected from a group of current draw experienced by the motor, power input to the motor, frequency output sent from the second controller to the motor, speed of the heating blower, and combinations thereof.

6. The system of claim 1, wherein the output signal is based on the condition.

7. The system of claim 1, wherein the sensor is located within the processing chamber.

8. The system of claim 1, wherein the first controller comprises a proportional integral derivative (PID) control loop and an algorithm configured to alter an output of the PID control loop and generate an algorithmic output, wherein the algorithmic output is based on at least one selected from a group of current draw experienced by the second motor, power input to the second motor, torque output of the second motor, frequency output sent from the second controller to the second motor, rotational speed of the heating blower, or combinations thereof.

9. The system of claim 1, wherein the first controller comprises a proportional integral derivative (PID) control loop and an algorithm configured to alter an output of the PID control loop and generate an algorithmic output, wherein the algorithmic output is based on the one or more conditions, wherein the one or more conditions further comprise one or more of, air density, or air viscosity within the processing chamber.

10. The system of claim 1, wherein the second controller comprises a variable frequency drive (VFD), a Pulse Width Modulated (PWM) AC speed control, a PWM DC speed control, a Silicon Controlled Rectifier (SCR) AC speed control, an SCR DC speed control, a variable voltage AC supply, a variable voltage DC supply, a variable current AC supply, a variable current DC supply, a thyristor based AC motor speed control, a thyristor based DC motor speed control, or a single-phase AC motor controller that uses Phase Angle Control.

11. A method, comprising:
    (a) receiving, from a plurality of sensors, a first condition, wherein the first condition comprises viscosity of a fluid in a circulation corridor and a first power related feedback comprising torque output of a motor operatively coupled to a heating blower;
    (b) generating a first output signal, by a first controller, and based on at least a first algorithmic output that is a function of the first condition and the first power related feedback;
    (c) sending the first output signal to a second controller, wherein the first output signal correlates with a first maximum allowable rotational speed of the motor;
    (d) receiving, from the at least one sensor, a second condition, wherein the second condition is different than the first condition and a second power related feedback, wherein the second power related feedback is different than the first power related feedback;
    (e) generating a second output signal, by the first controller, and based on a second algorithmic output that is a function of the second condition and the second power related feedback;
    (f) sending the second output signal to the second controller, wherein the second output signal correlates with a second maximum allowable rotational speed of the motor, which is greater than the first maximum allowable rotational speed wherein rotation speed of the motor is less than the second maximum allowable rotation speed of the motor and wherein the first maximum allowable rotational speed and the second maximum allowable rotational speed prevent failure of the motor.

12. The method of claim 11, wherein the steps of (a) through (f) are repeated until the condition is substantially equal to a set condition.

13. The method of claim 12, wherein the condition is a condition of the process chamber.

14. The method of claim 11, wherein the motor is operably coupled to a heating blower, wherein the first maximum allowable motor speed results in a first heating blower speed, and the second maximum allowable motor speed results in a second heating blower speed that is greater than the first heating blower speed.

15. The method of claim 11, wherein the first power related feedback and the second power related feedback are further at least one selected from a group of current draw experienced by the motor, power input to the motor, frequency output sent from the second controller to the motor, rotational speed of the heating blower, and combinations thereof.

16. The method of claim 11, wherein the receiving steps (a) and (d) further comprise receiving, from a flow sensor in the circulation corridor, fluid property feedback, the fluid property feedback being at least one selected from a group of a density of fluid in a circulation corridor, the viscosity of the fluid in the circulation corridor, a temperature of the fluid in the circulation corridor, and combinations thereof; and wherein the first and second output signals generated at steps (b) and (e) are further based on the fluid property feedback.

17. The method of claim 11, wherein the sensor is located within the processing chamber.

18. The method of claim 11, wherein the first controller comprises a proportional integral derivative (PID) control loop and an algorithm configured to alter an output of the PID control loop and generate an algorithmic output, wherein the algorithmic output is based on at least one selected from a group of current draw experienced by the motor, power input to the motor, torque output of the motor, frequency output sent from the second controller to the motor, speed of the heating blower, or combinations thereof.

19. The method of claim 11, wherein the first controller comprises a proportional integral derivative (PID) control loop and an algorithm configured to alter an output of the PID control loop and generate an algorithmic output, wherein the algorithmic output is based on at least one selected from a group of a density of fluid in the circulation corridor, a viscosity of the fluid in the circulation corridor, a temperature of the fluid in the circulation corridor, or combinations thereof.

20. The method of claim 11, wherein the second controller comprises a variable frequency drive (VFD), a Pulse Width Modulated (PWM) AC speed control, a PWM DC speed control, a Silicon Controlled Rectifier (SCR) AC speed control, an SCR DC speed control, a variable voltage AC supply, a variable voltage DC supply, a variable current AC supply, a variable current DC supply, a thyristor based AC motor speed control, a thyristor based DC motor speed control, or a single-phase AC motor controller that uses Phase Angle Control.

* * * * *